May 17, 1932. W. PEYINGHAUS 1,858,935
AXLE BEARING
Filed Feb. 11, 1931
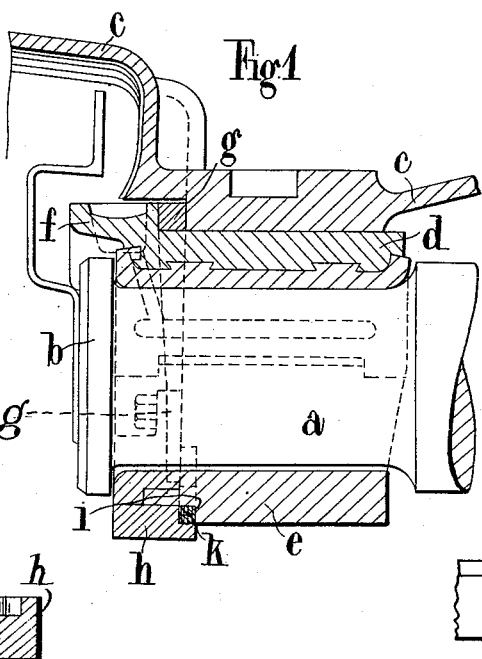
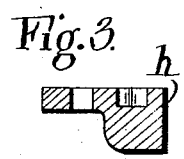
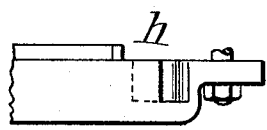
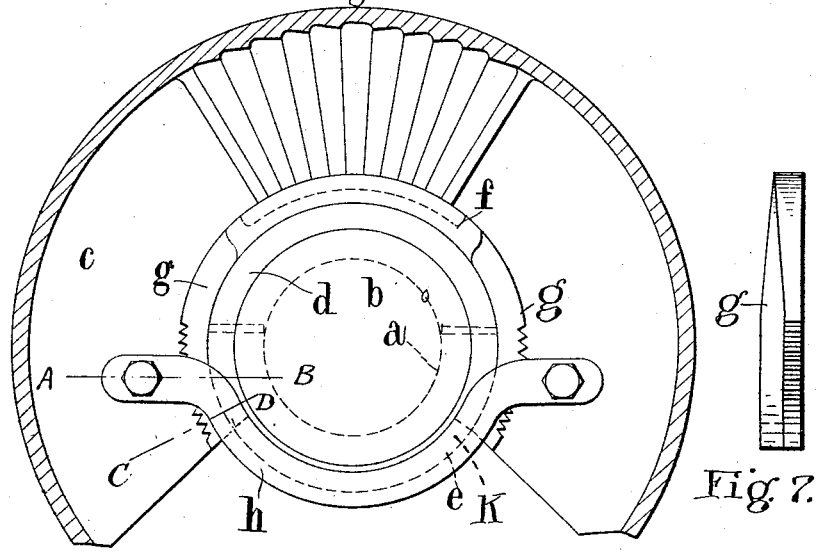
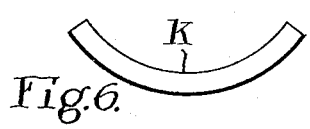
W. Peyinghaus
INVENTOR
BY: Marks & Clerk
ATTYS.

Patented May 17, 1932

1,858,935

UNITED STATES PATENT OFFICE

WALTER PEYINGHAUS, OF EGGE, NEAR VOLMARSTEIN, GERMANY

AXLE BEARING

Application filed February 11, 1931, Serial No. 515,094, and in Germany February 14, 1930.

It has already been proposed to place undivided axle boxes with a closed, divided bearing bush on an axle journal having a fixed collar, by lifting the axle box over the front and rear collar of the bearing bush and lowering it between these collars and thereupon to secure the bottom step in its position by longitudinal keys or transverse bolts in such a manner that it can act not only as a lubricating step but can take up shocks in the different directions.

This method of construction has a number of disadvantages: The lifting of the axle box when pushing it over the bearing bush necessitates a large portion of the rear wall of the box being cut away, so that it can pass over the oil thrower mounted on the axle, just at the place where on the vehicle canting oil may be lost by flowing over into the dust catcher. Furthermore, the securing of the bottom step by subsequently inserted keys or bolts necessitates the provision of extensions or projections as points of support for these parts in the space within the axle box under the axle journal, which are in the way when raising the axle box or must be placed so low that the axle box has to be made larger and heavier. Finally the axle box construction necessitated by this method of assembly makes it very difficult to make the bearing bush adjustable to allow for lateral wear of the same at the journal collar.

All these disadvantages are overcome when, in accordance with the invention, the method of assembling the parts is such that the axle box is, without lifting it, pushed on to the bearing bush which is previously turned through 180° on the journal, the flanges of the upper step thus extending downwards, after which the bearing bush is turned back into the correct position and secured in any suitable manner. This does away with all keys and bolts for supporting the bottom step under the axle journal and with this construction there is the further advantage that the whole bush can be made laterally adjustable by the insertion of a semi-annular key between the flange of the upper step and the inner wall of the axle box, so as to allow in a very simple manner for the wear between the bearing bush and the collar. For making the bearing bush adjustable it was found necessary to do away with the rear flange of the bearing bush and to secure the axle box against displacement rearwards by a stirrup member which engages in front of the journal collar under the bearing bush and bears by means of fitting pieces against a shoulder on the bottom step.

A constructional example of the invention is shown in the accompanying drawings, Fig. 1 being a longitudinal section through the axle box and the bearing bush, and Fig. 2 a cross-section through the forward part of the axle box and a front view of the axle journal collar and the bearing bush.

Fig. 3 is a section on the line A—B of Fig. 2, Fig. 4 is a section on the line C—D, Fig. 5 is a plan view of the stirrup member, Fig. 6 shows a fitting piece by way of example and Fig. 7 shows a semi-annular key.

In the drawings $a$ is the axle journal, $b$ the front fixed collar of the same, $c$ the axle box, $d$ the upper step, and $e$ the lower step of the complete bearing bush, $f$ the front flange of the upper step, $g$ the semi-annular adjusting key, $h$ the stirrup member with which the axle box engages under the bearing bush at the journal collar, $i$ the shoulder in the bottom step against which the stirrup member $h$ bears, and $k$ the fitting pieces, which are inserted between $h$ and $i$ and must be partly removed before adjusting the semi-annular key.

In assembling the axle bearing, first the two halves $d$, $e$ of the bearing bush are brought on to the pin which has a fixed flange in front but in such a manner that the upper step $d$ projects downwards and the lower step $e$ is at the top so that the front part $f$ of the upper step hangs down and the axle box $c$ can be pushed on without lifting it, which is possible because the axle box in the working position embraces the bearing bush over less than 360° minus an arc which corresponds to the circumference of the front part $f$. When the axle box has been pushed on in this position in which the bush is turned through 180°, the halves of the bush are turned back together into their normal position, the key $g$ being at the same time inserted between the front part $f$ and the axle box $c$. Then the stirrup member $h$ is screwed forwards and at the same time the fitting pieces $k$ are inserted between the stirrup member $h$ and the shoulder $i$ in the bottom step. Before the stirrup member $h$ is screwed up tight, the key $g$ is so adjusted by turning that the halves $d$, $e$ of the bush lie directly against the front flange.

In this construction there are no keys or bolts for supporting the lower step under the axle journal and there is also the possibility of making the whole bush laterally adjustable by sliding the semi-annular key $g$ between the flange of the upper step and the inner wall of the axle box in order to compensate the wear between the bush and the flange during operation in the simplest manner.

This is effected by the stirrup member $h$, when wear has occurred between the flange and the bush, first being released and then as many fitting pieces $k$ between the stirrup member $h$ and the shoulder $i$ being removed as correspond to the amount of wear. Then, while the axle bearing is relieved from the weight of the vehicle, the key $g$ is turned in a counter-clockwise direction (the bush $d$, $e$ being displaced forwards with respect to the axle box $c$) until the play between the flange and the bush is removed. Finally the stirrup member $h$ is screwed up again, different teeth of the key $g$ on the left and right engaging with the teeth of the stirrup member $h$ and fewer fitting pieces $k$ forming the insertion between the stirrup member $h$ and the shoulder $i$.

The key $g$ is provided at both ends over a certain length with fine teeth on its outer periphery, the teeth at both ends being similar. The stirrup $h$ has teeth at both ends but has interior teeth of two pocket-like recesses through which the externally toothed ends of the key $g$ are inserted to a greater or less extent according to the wear of the end surface of the bearing. Both the sets of teeth of the parts $g$ and $h$ are of the same pitch in order that the bearing may be uniformly and finely adjusted by the key $g$.

In this constructional form also the flange usually provided on the rear bush is dispensed with and the axial shocks coming from the axle towards the flange are transmitted through the bush $d$, $e$ to the stirrup member $h$ which on the lower side bears through the fitting pieces $k$ and the shoulder $i$ against the lower step $e$ and from the bush to the axle box $c$. In this case the stirrup member $h$ thus serves at the same time as a member for transmitting the forwardly directed shocks of the axle to the axle box and for protecting the actual position of the key $g$ which it holds in position by engaging its toothed ends.

What I claim is:

1. An axle bearing for railway vehicles, comprising means for top lubrication, a fixed journal collar, an axle box, a two-part bearing bush embraced by the axle box by more than 180° and capable of being turned through 180° into its operative position, a flange forming an oil catcher on the front end of the upper member of the two-part bearing bush, and a semi-annular key interposed between the said front flange and the axle box for eliminating the play between the bearing bush and the collar, caused by lateral wear, as and for the purpose set forth.

2. An axle bearing as claimed in claim 1 and comprising a stirrup member embracing the front end of the lower member of the two-part bearing bush for transmitting the axial shocks acting in the direction of the collar, a shoulder on the said lower member, fitting pieces interposed between the said shoulder and the stirrup member, against which fitting pieces the stirrup member bears, and ratchet teeth on the stirrup member and the semi-annular key for securing the latter in position, as and for the purpose set forth.

In testimony whereof I have signed my name to this specification.

WALTER PEYINGHAUS.